(12) United States Patent
Mancini

(10) Patent No.: US 9,802,376 B2
(45) Date of Patent: Oct. 31, 2017

(54) PROCESS FOR BUILDING TYRES AND TYRE OBTAINED THEREBY

(75) Inventor: Gianni Mancini, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 526 days.

(21) Appl. No.: 12/738,516

(22) PCT Filed: Oct. 29, 2008

(86) PCT No.: PCT/IB2008/054497
§ 371 (c)(1),
(2), (4) Date: Apr. 16, 2010

(87) PCT Pub. No.: WO2009/057057
PCT Pub. Date: May 7, 2009

(65) Prior Publication Data
US 2010/0218873 A1     Sep. 2, 2010

(30) Foreign Application Priority Data

Oct. 31, 2007   (WO) .................. PCT/IB2007/054420

(51) Int. Cl.
*B29D 30/20*    (2006.01)
*B29D 30/22*    (2006.01)
(Continued)

(52) U.S. Cl.
CPC ....... *B29D 30/1621* (2013.01); *B29D 30/242* (2013.01); *B29D 30/3021* (2013.01);
(Continued)

(58) Field of Classification Search
CPC ............ B29D 30/00; B29D 2030/0038; B29D 30/06; B29D 30/08; B29D 30/20;
(Continued)

(56) References Cited

U.S. PATENT DOCUMENTS 3,990,931 A   11/1976   Leblond et al.
4,082,132 A    4/1978   Arai et al.
(Continued)

FOREIGN PATENT DOCUMENTS

DE   10 2005 054507 A1   5/2007
EP       0066225 A2      12/1982
(Continued)

OTHER PUBLICATIONS

European Search Report for International Application No. PCT/IB2008/054497, mailing date Apr. 8, 2009.
(Continued)

*Primary Examiner* — Justin Fischer
(74) *Attorney, Agent, or Firm* — Finnegan, Henderson, Farabow, Garrett & Dunner, L.L.P.

(57) ABSTRACT

A pair of annular inserts of elastomeric material is circumferentially applied by spiraling around a laying surface of an auxiliary drum. Then a plurality of strip-like elements disposed in parallel side by side relationship with each other in the circumferential extension of the laying surface is applied onto the auxiliary drum, so as to form at least one first belt layer. Respectively opposite end portions of each strip-like element are radially superposed, each against one of the annular inserts, so that each of the annular inserts projects from a respective end edge of the strip-like element. The cap structure formed on the auxiliary drum is coupled to a carcass structure through toroidal conformation of the latter, in such a manner that the radially external ends of sidewall portions previously manufactured on the carcass plies are associated with the axially external ends of the annular inserts.

30 Claims, 4 Drawing Sheets

(51) Int. Cl.
  *B29D 30/30*  (2006.01)
  *B60C 9/18*   (2006.01)
  *B29D 30/16*  (2006.01)
  *B29D 30/24*  (2006.01)

(52) U.S. Cl.
  CPC ..... *B60C 9/1835* (2013.01); *Y10T 152/10054* (2015.01); *Y10T 152/10783* (2015.01)

(58) Field of Classification Search
  CPC .. B29D 2030/202; B29D 30/22; B29D 30/24; B29D 2030/241
  See application file for complete search history.

(56) References Cited

U.S. PATENT DOCUMENTS

| | | | |
|---|---|---|---|
| 4,273,177 A * | 6/1981 | Nybakken | B29D 30/08 152/209.5 |
| 4,683,928 A * | 8/1987 | Yahagi | 152/209.5 |
| 4,894,409 A * | 1/1990 | Shimada et al. | 524/492 |
| 5,215,612 A | 6/1993 | Motomura et al. | |
| 5,248,357 A * | 9/1993 | Miyanaga et al. | 156/128.1 |
| 7,306,021 B2 * | 12/2007 | Tsuruta | 152/531 |
| 8,029,632 B2 | 10/2011 | Seevers et al. | |
| 8,052,817 B2 * | 11/2011 | Ueda | B29D 30/1621 152/531 |
| 2001/0017179 A1 | 8/2001 | Tsurta | |
| 2002/0153083 A1 | 10/2002 | Takagi | |
| 2003/0051794 A1 | 3/2003 | Suda et al. | |
| 2003/0102088 A1 | 6/2003 | Iiduka | |
| 2005/0067080 A1 | 3/2005 | Ferlin | |
| 2005/0145314 A1 | 7/2005 | Ikeda et al. | |
| 2006/0090836 A1 | 5/2006 | Caretta et al. | |
| 2007/0102088 A1 | 5/2007 | Hayashi et al. | |
| 2007/0102090 A1 | 5/2007 | Kabe et al. | |
| 2008/0087367 A1 | 4/2008 | Lacagnina et al. | |

FOREIGN PATENT DOCUMENTS

| | | |
|---|---|---|
| EP | 0 419 142 A2 | 3/1991 |
| EP | 0 537 780 A2 | 4/1993 |
| EP | 0613757 A1 | 9/1994 |
| EP | 0976585 A2 | 2/2000 |
| EP | 1122098 A2 | 8/2001 |
| EP | 1170151 A2 | 1/2002 |
| EP | 1 785 284 A2 | 5/2007 |
| JP | 3-101922 | 4/1991 |
| JP | 4-219225 | 8/1992 |
| JP | 6-87302 * | 3/1994 |
| JP | 2003-213043 * | 7/2003 |
| JP | 2005-322494 | 11/2005 |
| JP | 2006-232895 * | 9/2012 |
| WO | WO 00/44547 A1 | 8/2000 |
| WO | WO 01/36185 A1 | 5/2001 |
| WO | WO 01/38077 | 5/2001 |
| WO | WO 03/074297 | 9/2003 |
| WO | WO 03/074297 A1 | 9/2003 |
| WO | WO 2004/022322 A1 | 3/2004 |
| WO | WO 2005/095092 A1 | 10/2005 |

OTHER PUBLICATIONS

Notice of Reasons for Rejection issued Nov. 13, 2012 by Japan Patent Office in corresponding Application No. JP 2010-530618 (3 pages).
English-language translation of Notice of Reasons for Rejection issued Nov. 13, 2012 by Japan Patent Office in corresponding Application No. JP 2010-530618 (4 pages).
Abstract of European Patent Publication No. EP 0066225, dated Dec. 8, 1982.
Abstract of European Patent Publication No. EP 0613757, dated Sep. 7, 1994.
Abstract of International Patent Publication No. WO 03/074297, dated Sep. 9, 2003.
Abstract of Japanese Patent Publication No. JP 2005-322494, dated Nov. 24, 2005.
Communication Pursuant to Article 94(3) EPC issued Oct. 22, 2012 by European Patent Office in related Application No. EP 07 826 933.9.
English-language translation of Notification of the First Office Action issued Aug. 2, 2012 by the State Intellectual Property Office of the People's Republic of China in related Application No. CN 200780101065.3 (10 pages).
Final Office Action mailed Apr. 22, 2013, in related U.S. Appl. No. 12/740,600 (9 pages).
Non-final Office Action mailed Aug. 27, 2014, in related U.S. Appl. No. 12/740,600 (10 pages).
Non-final Office Action mailed Nov. 3, 2011, in related U.S. Appl. No. 12/740,600 (15 pages).
Notification of the First Office Action issued Aug. 2, 2012 by the State Intellectual Property Office of the People's Republic of China in related Application No. CN 200780101065.3 (8 pages).

* cited by examiner

PROCESS FOR BUILDING TYRES AND TYRE OBTAINED THEREBY

CROSS REFERENCE TO RELATED APPLICATION

This application is a national phase application based on PCT/IB2008/054497, filed Oct. 29, 2008, which claims the priority of PCT/IB2007/054420, filed Oct. 31, 2007, the content of both of which is incorporated herein by reference.

BACKGROUND OF THE INVENTION

Field of the Invention

The present invention relates to a process for building tyres, and to a tyre for vehicle wheels obtained by said process.

Description of the Related Art

A tyre for vehicle wheels generally comprises a carcass structure including at least one carcass ply having respectively opposite end flaps in engagement with respective annular anchoring structures, integrated into the regions usually identified with the name of "beads", defining the radially internal circumferential edges of the tyre.

Associated with the carcass structure is a belt structure comprising one or more belt layers placed in radial superposed relationship relative to each other and to the carcass ply and having textile or metallic reinforcing cords with a crossed orientation and/or substantially parallel to the circumferential extension direction of the tyre. A tread band is applied at a radially external position to the belt structure, said tread band too being made of elastomeric material like other semifinished products constituting the tyre.

In the context of the present specification and in the following claims, by the term "elastomeric material" it is intended a composition comprising at least one elastomeric polymer and at least one reinforcing filler. Preferably, this composition further comprises additives such as cross-linking agents and/or plasticizers. Due to the presence of the cross-linking agents, this material can be cross-linked by heating, so as to form the final article of manufacture.

In addition, applied at an axially external position to the side surfaces of the carcass structure, each extending from one of the side edges of the tread band until close to the respective annular anchoring structure to the beads, are respective sidewalls of elastomeric material.

The sidewalls can be incorporated into the tyre structure following two different alternative design schemes, respectively referred to as "sidewalls over tread" (SOT) and "tread over sidewalls" (TOS). In the design scheme TOS, the radially external apices of the sidewalls are axially internal to the side edges of the tread band and generally interposed between the carcass ply/plies and the respective side edges of the belt structure. In the design scheme SOT, the radially external apices of the sidewalls laterally overlap the respective side edges of the tread band and are axially external thereto.

In the most widespread production processes the carcass plies are made starting from an article of manufacture in the form of a continuous strip, consisting of cords of textile or sometimes metallic material, disposed parallel to each other in a matrix of elastomeric material. A section of a length corresponding to the circumferential extension of the carcass ply to be obtained is cut from the continuous strip. The section is wound on the outer surface of a building drum, the opposite ends being mutually spliced so as to form a carcass ply. In turn, said carcass ply is associated with the aforesaid annular anchoring structures to form a carcass structure.

In the same manner, each of the belt layers is in turn made by winding of a section obtained from a semifinished product in a continuous strip, on an auxiliary drum. The belt structure thus formed, possibly already coupled to the tread band, is subsequently picked up from the auxiliary drum for being coupled to the carcass structure.

In order to avoid or limit storage and management of semifinished products, in recent years production processes have been developed in which at least part of the tyre components are made through laying of elementary components on a forming drum.

SUMMARY OF THE INVENTION

To the aims of the present invention, by "elementary components" it is intended continuous elongated elements of elastomeric material, and elongated elements of reinforced elastomeric material cut to size referred to as "strip-like elements". More specifically, in the present specification and in the following claims, by "strip-like element" it is intended an elementary component of elongated conformation cut to size and comprising one or more reinforcing cords mutually coplanar and parallel, longitudinally extending between two respectively opposite ends of said strip-like element and coupled to an elastomeric matrix.

These elementary components are adapted to be used in suitable amounts for composing one or more of the above described constituent elements of the tyre, without requiring storage of semifinished products.

For instance, document US 2007-0102090 proposes manufacture of a belt structure by laying of a plurality of strip-like elements arranged circumferentially in side by side relationship to each other on a forming drum.

The Applicant has however noticed that the strip-like elements usually obtained from a continuous article of manufacture having a straight extension, must necessarily undergo deformations during laying, so that they can adapt themselves to the bending of the laying surface of a forming drum, in particular when building of a belt structure is concerned.

The Applicant has verified that positioning of the strip-like elements applied to the forming drum can suffer for uncontrolled alterations during the laying step, also because the cords incorporated into the strip-like elements, above all if they are of the metal type, for instance during building of a layer of a typical belt structure, can retain inner tensions consequent to the deformation suffered by them during the laying step. As a result, it may happen that one or more strip-like elements applied to the laying surface, tend to move and/or detach from said surface, thus impairing the construction features of the belt structure and therefore of the tyre as a whole, in particular when said strip-like elements belong to the radially internal layer of the belt structure or when the laying surface is that of the forming drum itself.

The Applicant has also verified that when the strip-like elements are such positioned as to form a belt structure having at least one layer, it is necessary for the axial ends of said belt structure not to be in direct contact with the underlying carcass structure at the end of the step of mutual association, which generally takes place during the step of shaping the tyre being processed into a toroidal conformation. In fact, the Applicant has verified that since the strip-like elements are formed from a continuous elongated element cut to size, the ends can have sharp portions due to cutting of the metal reinforcing cords that, if in direct contact with the carcass structure, can generate regions that in use trigger cracks in the tyre.

The Applicant has perceived that, by applying at least one pair of annular inserts of raw elastomeric material onto the surface of an auxiliary drum used to form the belt structure before carrying out application of the strip-like elements, the above described problems can be overcome.

More specifically, the Applicant has found that if during said application step the opposite ends of each strip-like element are radially superposed, each against one of the annular inserts, so that the ends of each strip-like element are disposed axially internal relative to the position of said annular inserts, the strip-like elements appear to be fixed relative to the laying surface, due to the stickiness of the raw elastomeric material constituting the annular inserts, without on the other hand having ends contacting the carcass structure, at the end of the associating step between belt structure and carcass structure.

More particularly, in a first aspect, the present invention relates to a process for building tyres comprising the steps of:
forming a carcass structure comprising at least one carcass ply having end flaps in engagement with respective annular anchoring structures;
forming a belt structure comprising at least one first belt layer;
associating said belt structure with said carcass structure;
wherein the step of forming said carcass structure comprises at least the steps of:
forming at least one carcass ply around a building drum;
associating a pair of annular anchoring structures with said at least one carcass ply;
applying sidewall portions onto said at least one carcass ply;
wherein the step of forming said belt structure comprises at least the steps of:
providing an auxiliary drum having a radially external laying surface;
circumferentially applying a pair of annular inserts of raw elastomeric material around said radially external laying surface, said annular inserts being axially spaced apart from each other;
applying a plurality of strip-like elements onto the auxiliary drum, which strip-like elements are disposed parallelly in side by side relationship to each other in the circumferential extension of said laying surface, so as to form said at least one first belt layer;
wherein during said application step, respectively opposite end portions of each strip-like element are superposed, each against one of the annular inserts, in such a manner that each strip-like element has respective axially external end edges at an axially internal position relative to axially external ends of said annular inserts;
wherein said step of associating said belt structure with said carcass structure is carried out by shaping the carcass structure into a toroidal conformation, in such a manner that the radially external ends of said sidewall portions become associated with the axially external ends of said annular inserts.

Each of the strip-like elements can be therefore laid down with its ends overlapping the respective annular inserts, which adhere against the laying surface of the auxiliary drum over the whole circumferential extension of said laying surface, so as to keep a steady positioning.

In fact, due to stickiness which is peculiar to the raw elastomeric material composing the annular inserts, and to the axial extension of said inserts, efficient retaining of the strip-like elements at the respective ends is ensured as well as rest of said elements on an elastomeric material that will become a separation element as regards the carcass structure of the tyre being processed.

The Applicant has therefore verified that an efficient structural stabilisation of the strip-like elements on the auxiliary drum can be achieved, while at the same time limiting the necessity to resort to further technical expedients that could make the equipment more complicated.

In addition, the stabilisation action carried out by the annular inserts makes it possible, if required, to resort to anti-sticking coatings on the laying surface of the auxiliary drum, so as to facilitate removal of the belt structure for coupling it to the carcass structure.

The Applicant has finally ascertained that the improved structural stabilisation of the individual strip-like elements laid on the laying surface of the auxiliary drum reduces production waste and ensures more uniformity in the product quality.

In accordance with a second aspect, the invention relates to a tyre for vehicle wheels, comprising:
a carcass structure including at least one carcass ply having end flaps in engagement with respective annular anchoring structures;
a belt structure comprising at least one first belt layer;
a pair of sidewalls each having at least one sidewall portion laterally applied against said at least one carcass ply;
a pair of annular inserts of elastomeric material, axially spaced apart from each other, having respective axially external ends associated with radially external ends of said sidewall portions,
wherein said at least one belt layer comprises a plurality of strip-like elements disposed parallelly in side by side relationship to each other in the circumferential tyre extension, respectively opposite end portions of each strip-like element being radially superposed, each against one of the annular inserts, in such a manner that each strip-like element has axially external end edges in a position axially internal to the axially external ends of said annular inserts.

The Applicant has further verified that mutual mating of the radially external ends of the sidewalls and the axially external ends of the annular inserts leads to obtaining a design scheme of the TOS type, capable of simplifying the production processes, because application of the sidewall portions against the carcass ply or plies can be completed before carrying out shaping of the carcass structure for coupling of same to the belt structure.

In at least one of the aforesaid aspects, the present invention can further have one or more of the preferred features hereinafter described.

Each of the annular inserts is made by winding of at least one continuous elongated element of elastomeric material around the laying surface of the auxiliary drum.

The annular inserts thus formed carry out a "belting" action improving the positioning steadiness of same on the auxiliary drum.

Preferably, said continuous elongated element is wound so as to form a plurality of coils disposed close to each other.

Thus, by suitably modulating the amount and mutual positioning of the coils formed during winding, annular inserts of the desired conformation based on the design data can be manufactured, always using the same continuous elongated element. This allows manufacture of the annular inserts to be easily integrated into processes of modern conception in which, in order to avoid manufacture and/or storage of semifinished products, the different tyre components are made starting from elementary components.

Also eliminated is the risk that structural discontinuities may be created in the belt structure, which discontinuities can be hardly eliminated at the end-to-end joints usually carried out when annular inserts and/or belt layers are manufactured starting from semifinished ribbon-like elements, circumferentially wound around the auxiliary drum.

Preferably, the annular inserts are made of elastomeric material having a different composition than the composition of the elastomeric material constituting the sidewall portions applied against said at least one carcass ply.

In fact, the Applicant has noticed that the material usually forming the sidewalls, the composition of which must usually satisfy high-flexibility requirements in addition to offering an appropriate resistance to ageing under the effect of external agents, can appear to be non-optimal as regards protection of the underlying carcass ply/plies against the shearing action generated by the edges of the belt structure. In addition, the provided composition for the material constituting the sidewalls can be not very compatible with the compounds used for manufacturing the belt structure, usually conceived for obtaining optimal qualities of rubber-metal bond. It is therefore the Applicant's opinion that use of an elastomeric material having an optimal rubber-metal bond is preferable for said annular inserts, rather than a material having flexibility and/or protection features against the atmospheric agents.

In more detail, the composition of the elastomeric material constituting the annular inserts comprises at least one rubber-metal bonding system.

Said bonding system preferably comprises sulphur, resorcin and cobalt salt.

The composition of the elastomeric material constituting the annular inserts is of such a nature that, in the finished tyre, the annular inserts have a hardness greater than the hardness of the sidewall portions applied against said at least one carcass ply.

In this way, better protection of the carcass ply/plies against shearing stresses is obtained, which stresses are fundamentally transmitted by the axially external edges of the belt layers, during use of the tyre.

Said sidewall portions extend against said at least one carcass ply, starting from respective beads integrating said annular anchoring structures.

Each of said sidewall portions is preferably obtained through winding of at least one continuous elongated element of elastomeric material into a plurality of coils disposed close to each other, on said at least one carcass ply.

Preferably, said process comprises the step of forming a tread band at a radially external position to said belt structure, for manufacture of a cap structure.

More preferably, said process comprises the step of positioning the cap structure at a centred position around the carcass structure before said shaping step.

The tread band is preferably obtained through winding of at least one continuous elongated element of elastomeric material into a plurality of coils disposed close to each other around the belt structure.

Preferably, axially external end portions of the tread band are made of an elastomeric material having a different composition from the composition of the elastomeric material constituting an axially internal portion of the tread band.

More particularly, said axially external end portions of the tread band are made of an elastomeric material having a composition corresponding to the composition of the elastomeric material constituting the sidewall portions applied against said at least one carcass ply.

After the associating step, said axially external end portions of the tread band are preferably associated with the radially external ends of the sidewall portions applied against said at least one carcass ply.

Thus mutual coupling can be obtained between tread band and sidewalls according to a construction design of the SOT type, offering the advantage of efficiently protecting the side edges of the tread band against possible detachments from the tyre following strong stresses during use under heavy duty conditions like in the construction design of the TOS type, without involving particular manufacture complications in the process.

Preferably, each of the annular inserts preferably comprises at least one continuous elongated element of elastomeric material would into a plurality of coils disposed close to each other.

The annular inserts preferably define apices radially external to the sidewalls.

Preferably, a tread band is disposed at a radially external position to said belt structure.

Preferably, the tread band comprises at least one continuous elongated element of elastomeric material wound into a plurality of coils disposed close to each other around the belt structure.

The axially external end portions of the tread band are preferably associated with the radially external ends of the sidewall portions laterally applied against said at least one carcass ply.

Further features and advantages will become more apparent from the detailed description of a preferred but not exclusive embodiment of a process for building tyres and of a tyre obtained by said process, in accordance with the present invention.

BRIEF DESCRIPTION OF THE DRAWINGS

This description will be set out hereinafter with reference to the accompanying drawings, given by way of non-limiting example, in which.

DETAILED DESCRIPTION OF THE INVENTION

Figure 1:
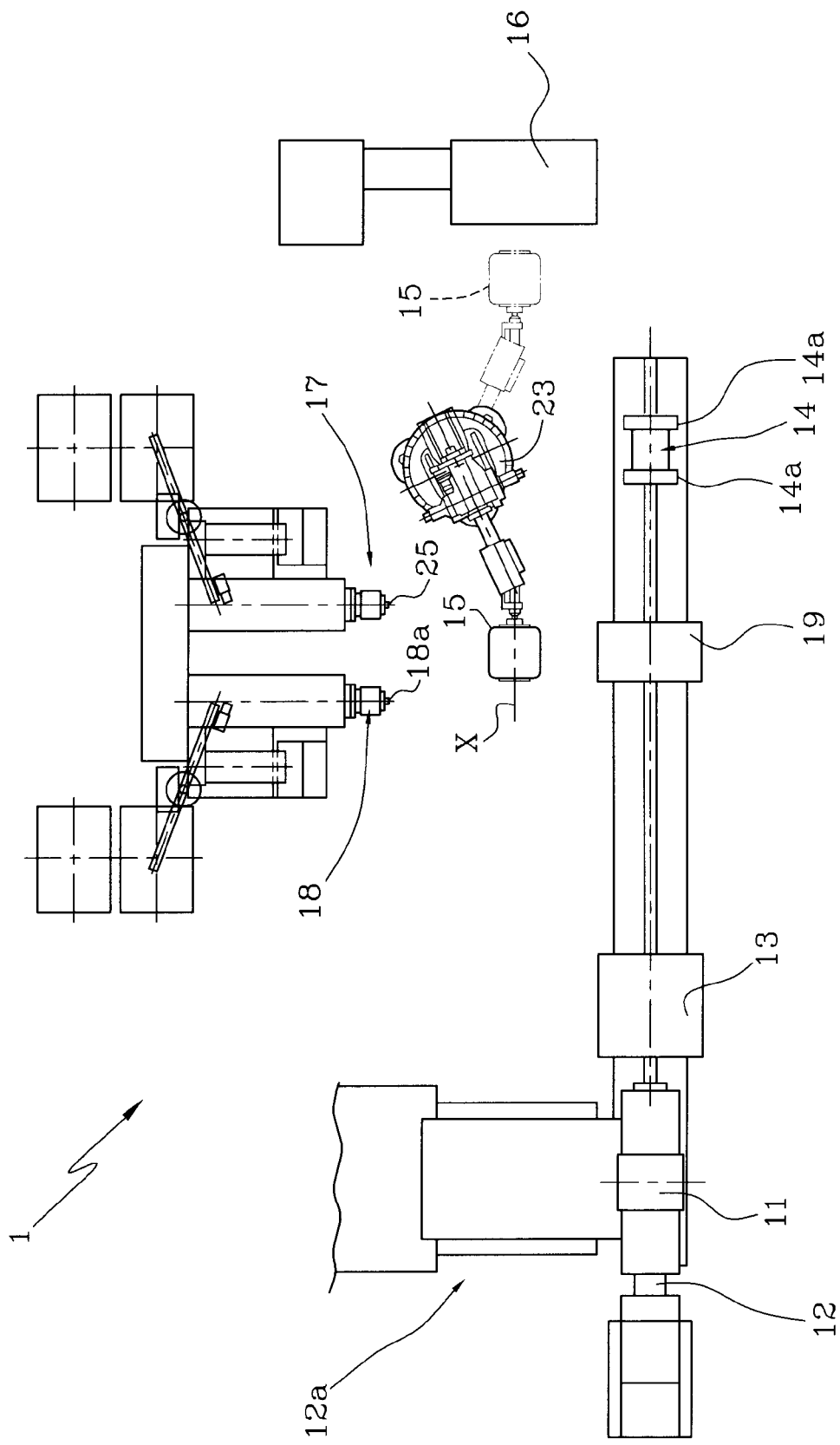
FIG. 1 diagrammatically shows a top view of an apparatus for manufacturing tyres in accordance with the present invention.

With reference to the drawings, an apparatus for manufacturing tyres for vehicle wheel, designed to carry out a process in accordance with the present invention, has been generally identified by reference numeral 1.

Figure 5:
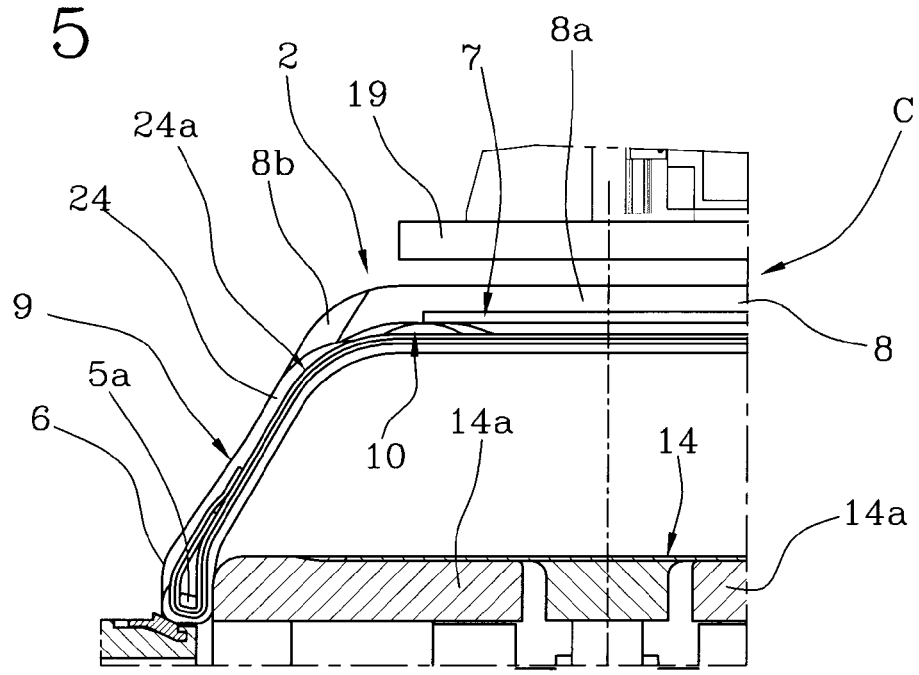
FIG. 5 shows a step in which the carcass structure is shaped so as to couple it to the cap structure.
Figure 6:
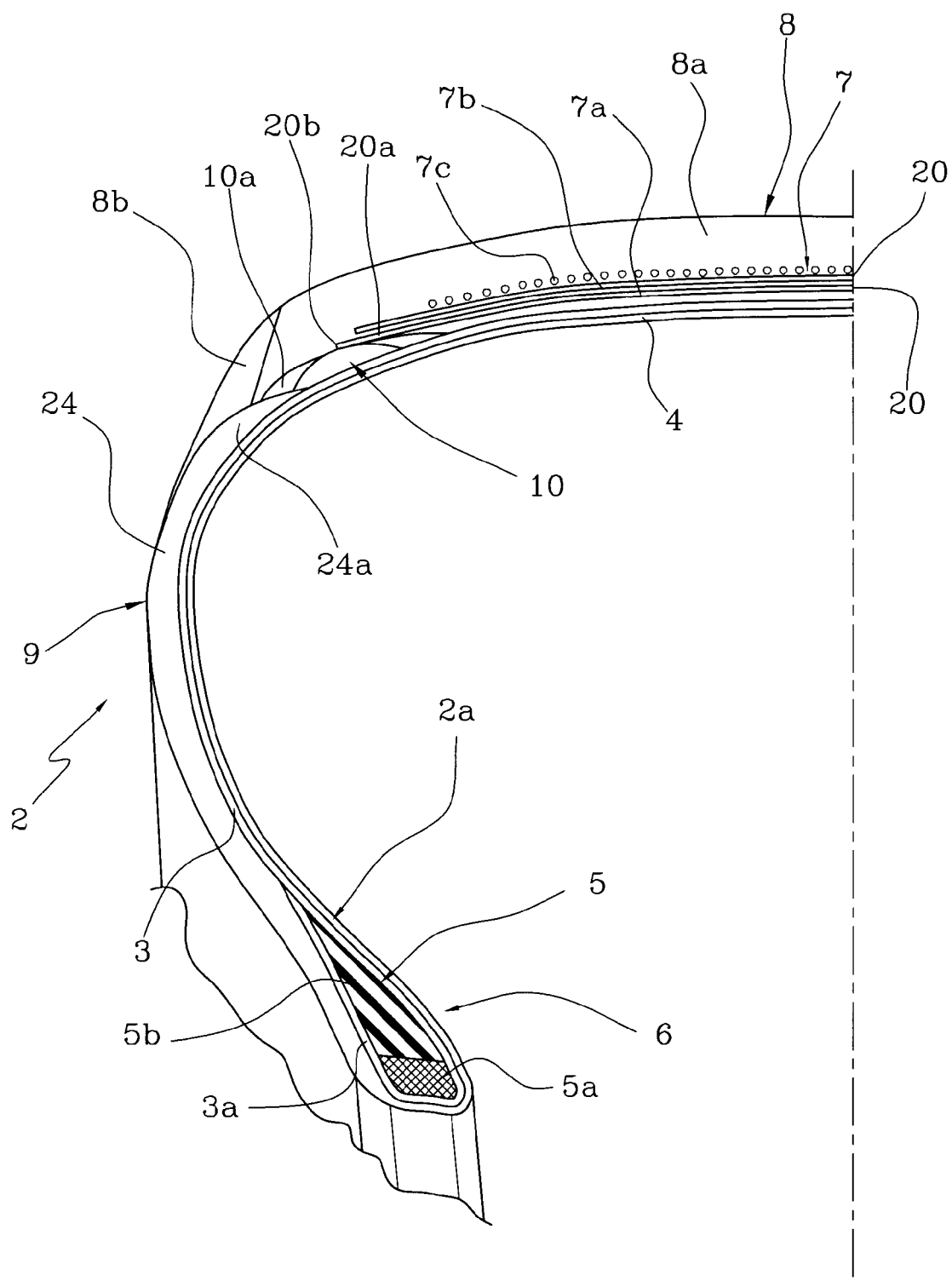
FIG. 6 is a fragmentary diametrical section view of a tyre to be manufactured following the process and apparatus referred to in the preceding figures.

Apparatus 1 is intended for manufacture of tyres 2 (FIGS. 5 and 6) essentially comprising a carcass structure 2*a* having at least one carcass ply 3. A layer of airtight elastomeric material, or a so-called liner, can be applied internally of the carcass ply/plies 3. Two annular anchoring structures 5, each comprising a so-called bead core 5*a* associated with an elastomeric filler 5*b*, are in engagement with respective end flaps 3*a* of the carcass ply/plies 3. Two regions usually identified as "beads" 6, at which engagement between tyre 2 and a respective mounting rim usually occurs, include said annular anchoring structures 5.

A belt structure 7 comprising one or more belt layers 7*a*, 7*b*, 7*c* is circumferentially applied around the carcass ply/plies 3, and a tread band 8 circumferentially overlaps the belt structure 7.

Two sidewalls 9, each extending from the corresponding bead 6 until close to a corresponding side edge of the tread band 8, are applied at laterally opposite positions on the carcass ply/plies 3.

Interposed between the carcass ply/plies 3 and the axially external edges of the belt structure 7 are respective annular inserts 10 of elastomeric material that are axially spaced apart from each other. The annular inserts 10 having respective axially external ends 10*a* projecting beyond the corresponding edges of the belt structure 7, define radially external apices of the sidewalls 9, each joined to a radially external end of a respective sidewall portion 24 laterally applied against the carcass ply/plies 3.

Apparatus 1 comprises a primary building drum 11 on which at least part of the components designed to form the carcass structure 2*a* of tyre 2 is build and/or assembled. The primary drum 11 can indifferently consist either of a first-stage building drum, should apparatus 1 be designed, as in the example shown, to carry out a building process of the so-called "two-stage type", or of a building drum of the type usually referred as "unistage", should accomplishment of a unistage building process be desired.

Herein and in the following of the specification by "unistage building process" it is intended a process in which the carcass structure is dismantled from its own building drum only at the end of building of the tyre itself; and by "two-stage building process" it is intended a process in which the carcass structure is dismantled from its own building drum as soon as it has been built into a cylindrical shape, to be then transferred to a shaping drum for assembly with the respective belt structure 7.

The primary drum 11 is operatively supported by a mandrel 12 or a robotized arm or other device, allowing said drum, if necessary, to be driven in rotation and/or suitably moved during application of the components of the carcass structure 2*a* at least at one building station 12*a*.

More particularly, the primary drum 11 lends itself to first receive the possible liner 4, and then the carcass ply or plies 3, so as to form a cylindrical sleeve on the opposite end flaps of which the annular anchoring structures 5 are subsequently fitted.

In more detail, in the embodiment shown in FIG. 1, the carcass ply or plies 3 are formed from at least one semifinished product in the form of a continuous strip circumferentially wound around the primary drum 11.

According to an embodiment of the present invention, said at least one carcass ply 3 can be made by application of a plurality of strip-like elements (not shown in the drawings) in mutually approached relationship along the circumferential extension of the primary drum 11.

Turning-up of the end flaps 3*a* of the carcass ply/plies around the annular anchoring structures 5 can be subsequently carried out.

Figure 2:
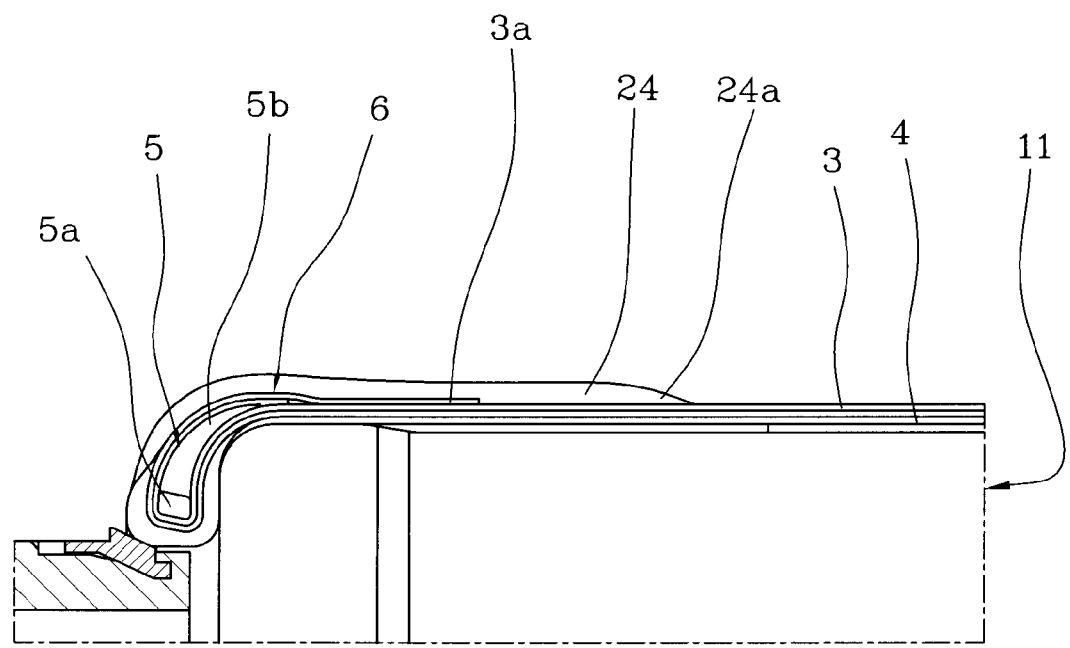
FIG. 2 shows a working step in which a sidewall portion is manufactured on the carcass structure previously formed on a building drum.

As shown by way of example in FIG. 2, further applied are at least two sidewall portions 24, each of which extends against the carcass ply/plies 3, starting from a respective bead 6 integrating one of the annular anchoring structures 5.

Each of said sidewall portions 24 can be obtained through winding of at least one continuous elongated element of elastomeric material into a plurality of coils disposed close to each other on said at least one carcass ply 3.

In the embodiment shown in FIG. 1 where tyre building takes place by a two-stage process, the carcass structure 2*a*, made in the form of a cylindrical sleeve, is picked up from the primary drum 11 by a first transfer member 13 carrying out engagement of same on a shaping drum 14, or second-stage drum, axially divided into two halves 14*a*. The drum halves 14*a* can be mutually approached and prepared for engagement with the carcass structure 2*a*, each at one of the annular anchoring structures 5.

Apparatus 1 may further comprise an auxiliary drum 15 on which the belt structure 7 is formed by assembly, in a predetermined sequence, of the respective components coming from a first feeding unit 16 and adapted to obtain the belt layer or layers 7*a*, 7*b*, 7*c*.

Also preferably interlocked with the auxiliary drum 15 is at least one second feeding unit 17 designed to obtain annular inserts 10. At least one third feeding unit 18 can be provided for applying the tread band 8 at a radially external position onto the belt structure 7 so as to form a cap structure C together with said belt structure 7 and the annular inserts 10, for coupling to the carcass structure 2*a*.

A possible second transfer member 19 movable between the auxiliary drum 15 and the shaping drum 14, preferably along a direction of mutual axial alignment of said drums, carries out transfer of the cap structure C onto the carcass structure 2*a* supported by the shaping drum 14.

In known manner, when the cap structure C is in a centred position relative to the carcass structure 2*a*, the opposite halves 14*a* of the shaping drum 14 are mutually approached in an axial direction, simultaneously with admission of fluid into the carcass ply or plies 3, so as to shape the carcass structure 2*a* into a toroidal configuration. Consequent radial expansion of the carcass ply/plies 3 leads the same to adhere against the inner surface of the cap structure C, retained by the second transfer member 19.

Tyre 1 thus shaped lends itself to be removed from the shaping drum 14 to be submitted to a vulcanisation and moulding treatment and/or to other working operations provided in the work cycle.

According to an embodiment of the present invention, said at least one belt layer 7*a*, 7*b*, can be made by application of a plurality of strip-like elements 20, in mutually approached relationship along the circumferential extension of the auxiliary drum 15.

In more detail, in the embodiment shown in FIG. 1, the first feeding unit 16 is adapted to carry out application of strip-like elements 20 onto the auxiliary drum 15 to make the belt layers 7. The carcass structure 2*a* is, in turn, manufactured on said primary drum 11 through application of the carcass ply/plies 3 formed of at least one semifinished product in the form of a continuous strip for example, wound around the primary drum.

To this aim, the first feeding unit 16, not described in detail for the sake of brevity, can be made for example, if not otherwise described in the present specification, following what stated in the U.S. Pat. No. 6,702,913 in the name of the same Applicant.

The auxiliary drum 15 in a radially external position shows a laying surface 21 of substantially cylindrical conformation for example, preferably formed with a plurality of circumferential sectors 22 (diagrammatically shown in FIGS. 3 and 4) consecutively disposed around a geometric symmetry axis X (FIG. 1) of the auxiliary drum and simultaneously translatable in a radial direction.

Radial mobility of the circumferential sectors 22 allows the diametrical sizes of the drum to be varied, starting from a minimum diameter at which the circumferential sectors 22 can act mutually in abutment by means of respective circumferential shoulders they are provided with at the laying surface 21, so as to give said surface a continuous course.

At least one robotized arm 23 is adapted to support and conveniently handle the auxiliary drum 15 in front of the feeding units 16, 17 and 18 for manufacturing the cap structure C on the auxiliary drum.

Manufacture of the belt structure 7 first involves arrangement of the auxiliary drum 15 in front of the second feeding unit 17 for carrying out application of the annular inserts 10 onto the laying surface 21. Each annular insert 10 is made by winding at least one continuous elongated element (not shown) of elastomeric material around the laying surface 21 of the auxiliary drum 15. More particularly, to this aim a so-called "spiralling" operation is preferably carried out, according to which the continuous elongated element is wound into a plurality of coils 1 that are substantially circumferential and mutually approached around the laying surface 21.

For the above purpose, the second feeding unit 17 can comprise at least one dispensing unit 25 such as an extrusion die for example, adapted to supply the auxiliary drum 15 with the continuous elongated element, while said drum 15 is being driven in rotation about a geometric axis X thereof by a motor carried by the robotized arm 23, and conveniently moved thereby to carry out distribution of coils S in a manner adapted to give the annular insert 10 being made a desired conformation.

The continuous elongated element supplied from the second feeding unit 17 is preferably made up of an elastomeric material having a composition different from that used for the elastomeric material respectively constituting the tread band 8 and the sidewall portions 28 applied against the carcass structure. More particularly, the elastomeric material constituting the continuous elongated element supplied by the second feeding unit for manufacturing the annular inserts 10 has a composition comprising a rubber-metal bonding system, such as high-percentage sulphur+resorcin+cobalt salt. Thus an optimal anchoring of the annular inserts 10 to the metal cords constituting the belt structures is ensured.

In addition, the composition of the elastomeric material constituting the annular inserts 10 is of such a nature that, in the finished tyre, i.e. when vulcanisation has been completed, the annular inserts have a hardness greater than the hardness of the sidewall portions 24 laterally applied against the carcass ply/plies 3. The annular inserts 10 are thus adapted to protect the carcass ply/plies 3 in an optimal manner against shearing stresses fundamentally transmitted, during use of the tyre, by the axially external edges of the belt layers.

It is preferable that during formation of the annular inserts 10 the auxiliary drum 15 will be set to the minimum diameter to which the mutual contact of the circumferential sectors 22 in surface continuity relationship corresponds. Thus the risk is eliminated that the continuous elongated element, even if applied directly in contact with the auxiliary drum 15, may break during the winding step, by effect of anomalous stresses caused by undesirable surface discontinuities.

When application of the annular inserts 10 has been completed, before starting application of the belt layer or layers 7a, 7b, 7c, the auxiliary drum 15 can be advantageously expanded starting from the minimum diameter until a predetermined first work diameter, suitable to enable correct laying of the strip-like elements 20 for application of the first belt layer 7a at a position radially external to the annular inserts 10.

More particularly, the first work diameter has such a value that each of the strip-like elements 20 subsequently applied will subtend, on the laying surface 21, an arc of a circumference of a width substantially equal to a submultiple integer of the overall circumferential extension of the laying surface 21.

The robotized arm 23 carries out appropriate positioning of the auxiliary drum 15 at the first feeding unit 16 and drives said drum in rotation, according to a step-by-step movement for example, in synchronism with laying of the individual strip-like elements 20 onto the laying surface 21, in such a manner that the strip-like elements are applied in succession adjacent to each other, each following an orientation parallel to or suitably inclined relative to the geometric axis X.

Movement of the auxiliary drum 15 takes place according to steps of angular width substantially equal to or at all events correlated with the angle subtended by each of the laid strip-like elements 20, on the laying surface 21. In this manner the opposite longitudinal edges of respectively adjacent strip-like elements 20 will be mutually mating or, if necessary, spaced apart by a predetermined and constant amount over the whole circumferential extension of the belt layer which is obtained.

Figure 3:
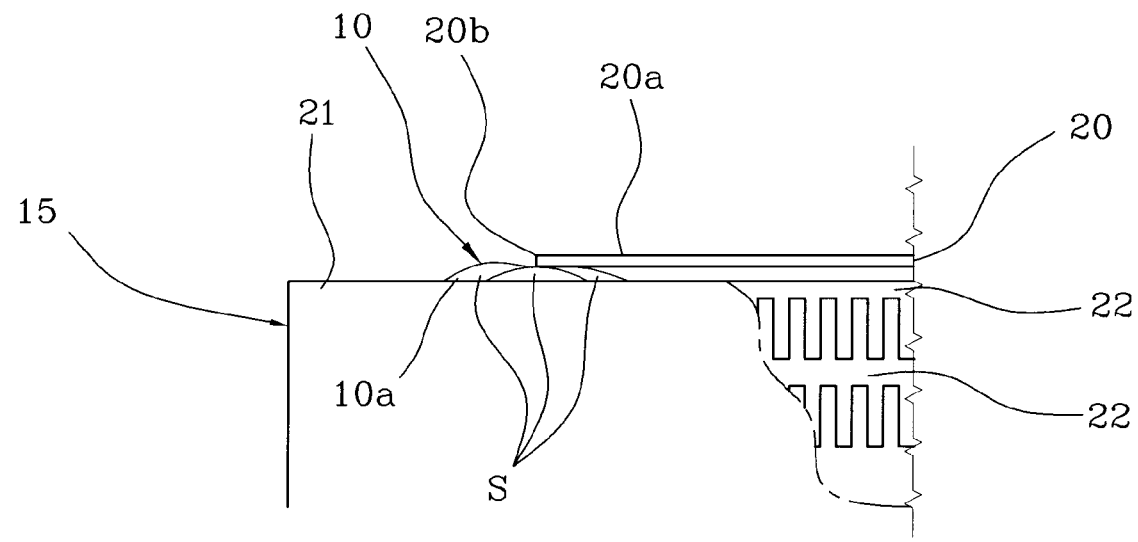
FIG. 3 shows a working step of a belt structure of a tyre, in which a first belt layer has been manufactured, which partly overlaps annular inserts previously formed on an auxiliary drum.
Figure 4:
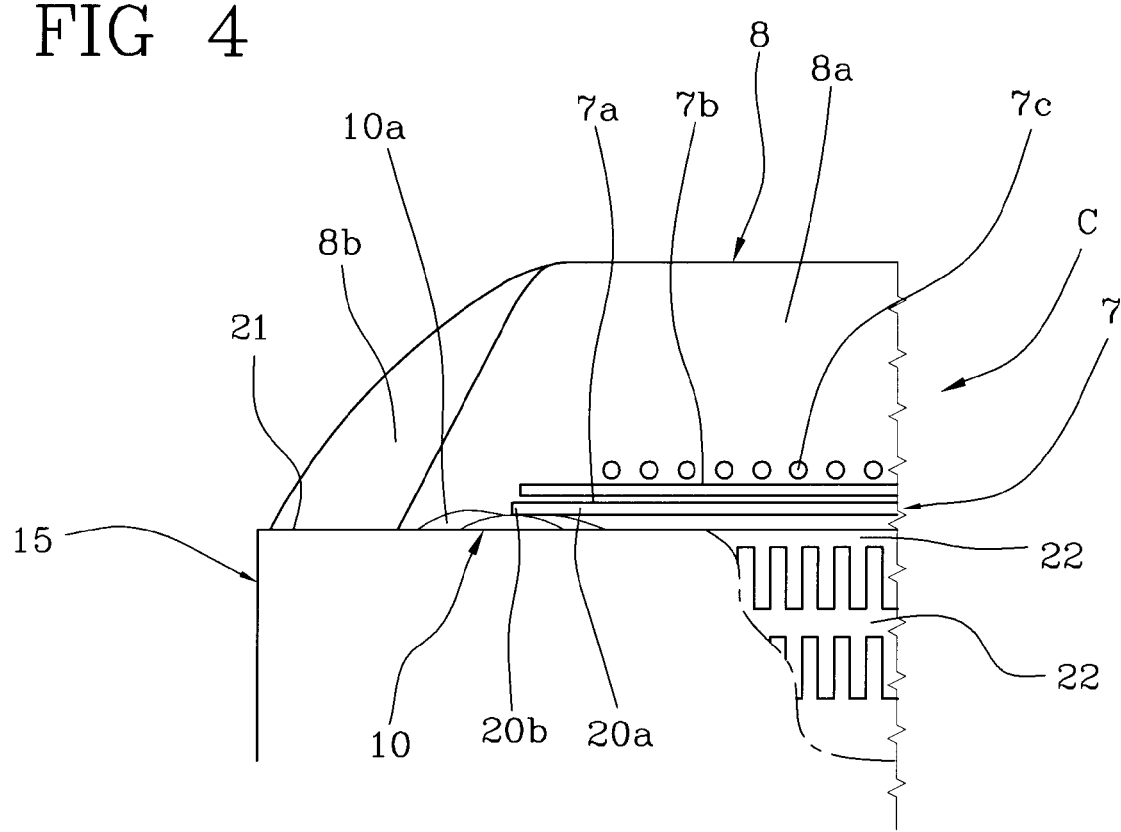
FIG. 4 shows a working step following that in FIG. 3, in which a tread band has been formed, which radially overlaps the belt structure, to define a cap structure therewith.

As shown in FIG. 3, during said application step, the axially external end portions 20a of the individual strip-like elements 20 composing the first belt layer 7a are radially superposed, each against one of the annular inserts 10. By so doing, when laying has been completed, each strip-like element 20 has respective axially external end edges 20b at an axially internal position relative to the axially external ends 10a of the annular inserts 10, axially projecting outwards from the respective axially external edges of the first belt layer 7a.

A second belt layer 7b can be subsequently formed at a position radially external to the first belt layer 7a. The second belt layer 7b can be obtained in the same manner as previously described with reference to the first belt layer 7a, but with the strip-like elements 20 preferably oriented in a crossed direction relative to the strip-like elements 20 of the first layer. During manufacture of the second belt layer 7b, the laying surface 21 of the auxiliary drum 15 will be represented by the first belt layer 7a previously formed.

Subsequently to formation of the second belt layer 7b, i.e. the radially outermost belt layer, the auxiliary drum 15 can be radially expanded to a predetermined second work diameter, so as to impose a permanent expansion to the annular belt layers 7a, 7b, according to the desired circumferential extension as determined by the design standards.

Application of a third belt layer 7c can be subsequently provided, said third layer 7c comprising one or more cords wound into axially approached coils, at a position radially external to the underlying belt layers.

The auxiliary drum 15 is subsequently brought close to the third feeding unit 18 to allow application of the tread band 8 in radially superposed relationship with the belt structure 7.

In the same manner as described with reference to the second feeding unit 17, the third feeding unit 18 can for example comprise at least one extrusion die or other device adapted to supply a continuous elongated element in the form of coils S (not shown) disposed close to each other and/or superposed on the belt structure 7 and/or on the auxiliary drum 15, while said drum is being driven in rotation and conveniently moved for determining distribution of coils S in a manner adapted to give the tread band 8 being manufactured a desired final conformation.

More particularly, the third feeding unit 18 preferably comprises a primary dispensing device 18a carrying out application of at least one axially internal portion 8a of the tread band 8, extending over a prevailing portion of the axial extension of said tread, and an auxiliary dispensing device (not shown in the figures) in some cases carrying out manufacture of axially external end portions 8b of the tread band itself. The axially internal portion 8a can be made of an elastomeric material having a composition adapted to obtain optimal performance in terms of roadholding and/or resistance to wear. The axially external end portions 8b of the tread band 8 can in turn be made of an elastomeric material having a different composition from the composition of the elastomeric material constituting the axially internal portion 8a and preferably corresponding to the composition of the elastomeric material constituting the sidewall portions 24 applied against the carcass ply/plies.

To allow disengagement of the belt structure 7, the auxiliary drum 15 can be subsequently contracted to a diameter smaller than the first work diameter. Under this circumstance the cap structure C can be axially slipped off the auxiliary drum 15 brought to interact with the second transfer member by the robotized arm 23, said cap structure C being then associated with the carcass structure 21 provided on the shaping drum 14, as previously described.

During expansion of the carcass structure 2a according to a toroidal configuration, the radially external ends 24a of the sidewall portions 24 laterally applied against the carcass ply/plies 3 are joined to the axially external ends 10a of the respective annular inserts 10. Thus integration of the sidewalls 9 into tyre 2 is determined according to a design scheme of the TOS type, wherein the annular inserts 10 constitute the radially external apices of sidewalls 9, partly interposed between the belt structure 7 and the carcass ply/plies 9.

At the end of the shaping step, possibly by a rolling operation to be carried out in known manner, intimate coupling between the cap structure C and the carcass structure 2a is determined. During this step the axially external end portions 8b of the tread band 8 are spliced to the radially external ends 24a of the sidewall portions 24 laterally applied against the carcass ply/plies 3. Thus, also by effect of the mutual correspondence between the compositions of the elastomeric materials respectively constituting the axially external end portions 8b of the tread band 8 and the sidewall portions 24 laterally applied against the carcass ply 3, a mutual coupling is determined between the tread band 8 and the sidewalls 9 according to a design scheme of the SOT type, so that the side edges of the tread band 8 are protected against possible detachments from the tyre even following use of same under heavy duty conditions.

The Applicant finally points out that the same process and the same tyre can be manufactured using a primary drum 11 of the unistage type. In this case the cap structure C manufactured after passage of the auxiliary drum along the feeding units 16, 17, and 18, is preferably transferred by the second transfer member 19 to the primary drum 11 for carrying out the shaping step.

The invention claimed is:

1. A process for building a tyre comprising:
   forming a carcass structure comprising at least one carcass ply having end flaps in engagement with respective annular anchoring structures, wherein forming said carcass structure comprises:
      forming at least one carcass ply around a building drum;
      associating a pair of annular anchoring structures with said at least one carcass ply; and
      applying sidewall portions on said at least one carcass ply, wherein each of said sidewall portions is obtained through winding of at least one continuous elongated element of elastomeric material into a plurality of coils disposed close to each other on said at least one carcass ply;
   forming a belt structure having at least one first belt layer, wherein forming said belt structure comprises:
      providing an auxiliary drum having a radially external laying surface;
      circumferentially applying, onto said laying surface, a pair of annular inserts of raw elastomeric material, axially spaced apart from each other and each from a respective axially external edge of the laying surface, wherein said annular inserts each have an axially external end edge and an axially internal end edge lying against said laying surface; and
      applying a plurality of strip-like elements onto said laying surface of the auxiliary drum, which strip-like elements are disposed in parallel side by side relationship with each other in the circumferential extension of said laying surface, so as to form said at least one first belt layer,
      wherein during applying of strip-like elements, respectively opposite end portions of each strip like element are radially superposed, each against one of the annular inserts, in such a manner that each strip-like element has respective axially external end edges at an axially internal position relative to axially external ends of said annular inserts;
   forming a tread band at a radially external position to said belt structure, by winding at least one continuous elongated element of elastomeric material into a plurality of coils disposed close to each other around the belt structure, around the pair of annular inserts, and on the auxiliary drum lateral to the annular inserts, wherein axially external end portions of the tread band are made of an elastomeric material having a different composition from the composition of the elastomeric material of the axially internal portion of the tread band and being the same as the composition of the elastomeric material of the sidewall portions applied against said at least one carcass ply; and
   associating said belt structure with said carcass structure by shaping the carcass structure from a cylindrical shape into a toroidal conformation, the associating causing radially external ends of said sidewall portions to become joined to the axially external ends of said annular inserts and to be axially internal to and spliced to said axially external end portions of the tread band;
   wherein the annular inserts define radially external apices of the sidewalls, and the elastomeric material of the annular inserts has a hardness greater than the hardness of the sidewall portions applied against said at least one carcass ply.

2. The process as claimed in claim 1, wherein said circumferentially applying a pair of annular inserts comprises extruding at least one continuous elongated element of raw, sticky elastomeric material around and onto the laying surface of the auxiliary drum, and wherein said applying of strip-like elements comprises sticking the opposite end portions of each strip-like element to one of the annular inserts, such that each strip-like element is fixed in place relative to said laying surface due to the stickiness of the raw elastomeric material of the extruded annular inserts.

3. The process as claimed in claim 1, wherein the annular inserts are made of an elastomeric material having a composition different from the composition of the elastomeric material of the sidewall portions applied against said at least one carcass ply.

4. The process as claimed in claim 1, wherein the composition of the elastomeric material of the annular inserts comprises at least one rubber-metal bonding system.

5. The process as claimed in claim 4, wherein said bonding system comprises sulfur, resorcin and cobalt salt.

6. The process as claimed in claim 1, wherein said sidewall portions extend against said at least one carcass ply, starting from respective beads integrating said annular anchoring structures.

7. The process as claimed in claim 1, further comprising manufacturing a cap structure by forming said tread band at a radially external position to said belt structure, and positioning said cap structure at a centered position around the carcass structure before said shaping step.

8. The process as claimed in claim 1, wherein forming the tread band at a radially external position to said belt structure comprises:
   winding the at least one continuous elongated element of elastomeric material having the different composition from the elastomeric material of the sidewall portions into a plurality of coils disposed close to each other around the belt structure, around the pair of annular inserts, and the auxiliary drum at a position to form an axially internal portion of the tread band, and
   applying the elastomeric material having the same composition as the elastomeric material of the sidewall portions circumferentially around the laying surface on the auxiliary drum lateral to the respective pair of annular inserts, the elastomeric material being applied axially between one of said annular inserts and the respective axially external edge of the laying surface to form axially external end portions of the tread band.

9. A process for building a tyre comprising:
   forming a carcass structure comprising at least one carcass ply having end flaps in engagement with respective annular anchoring structures;
   forming a belt structure comprising at least one first belt layer; and
   after forming the carcass structure and forming the belt structure, associating said belt structure with said carcass structure,
   wherein forming said carcass structure comprises at least:
      forming at least one carcass ply around a building drum;
      associating a pair of annular anchoring structures with said at least one carcass ply; and
      applying sidewall portions on said at least one carcass ply;
   wherein forming said belt structure comprises at least:
      providing an auxiliary drum having a central axis and a radially external laying surface of substantially cylindrical conformation around the central axis;
      circumferentially applying a pair of annular inserts of raw elastomeric material, axially spaced apart from each other, onto said laying surface, wherein said annular inserts each have an axially external end edge and an axially internal end edge lying against said laying surface; and
      applying a plurality of strip-like elements onto said laying surface of the auxiliary drum, which strip like elements are disposed in parallel side-by-side relationship with each other in the circumferential extension of said laying surface, so as to form said at least one first belt layer,
   wherein during applying of strip-like elements, the external surfaces of said pair of annular inserts radially exceed the laying surface of the auxiliary drum between the pair of annular inserts, and respectively opposite end portions of each strip-like element are radially superposed, each against one of the annular inserts, in such a manner that each strip-like element has respective axially external end edges at an axially internal position relative to axially external ends of said annular inserts applied on said laying surface; and
   wherein said step of associating said belt structure with said carcass structure is carried out by shaping the carcass structure from a cylindrical shape into a toroidal conformation in such a manner that radially external ends of said sidewall portions become joined to the axially external ends of said annular inserts;
   wherein the annular inserts define radially external apices of the sidewalls, and the elastomeric material of the annular inserts has a hardness greater than the hardness of the sidewall portions applied against said at least one carcass ply.

10. The process as claimed in claim 9, further comprising forming a tread band at a radially external position to said belt structure, by winding at least one continuous elongated element of elastomeric material into a plurality of coils disposed close to each other around the belt structure, around the pair of annular inserts, and/or on the auxiliary drum, wherein axially external end portions of the tread band are made of an elastomeric material having a different composition from the composition of the elastomeric material of the axially internal portion of the tread band and being the same as the composition of the elastomeric material of the sidewall portions applied against said at least one carcass ply.

11. The process as claimed in claim 10, wherein forming the tread band at a radially external position to said belt structure comprises:
   winding the at least one continuous elongated element of elastomeric material having the different composition from the elastomeric material of the sidewall portions into a plurality of coils disposed close to each other around the belt structure, around the pair of annular inserts, and the auxiliary drum at a position to form an axially internal portion of the tread band, and
   applying the elastomeric material having the same composition as the elastomeric material of the sidewall portions on the auxiliary drum lateral to the respective pair of annular inserts to form axially external end portions of the tread band.

12. The process as claimed in claim 9, wherein the joining causes the radially external ends of said sidewall portions to be axially internal to and spliced to said axially external end portions of the tread band.

13. The process as claimed in claim 9, wherein said circumferentially applying a pair of annular inserts comprises extruding at least one continuous elongated element of raw, sticky elastomeric material around and onto the laying surface of the auxiliary drum, and wherein said applying of strip-like elements comprises sticking the opposite end portions of each strip-like element to one of the annular inserts, such that each strip-like element is fixed in place relative to said laying surface due to the stickiness of the raw elastomeric material of the extruded annular inserts.

14. The process as claimed in claim 9, wherein the annular inserts are made of an elastomeric material having a composition different from the composition of the elastomeric material of the sidewall portions applied against said at least one carcass ply.

15. The process as claimed in claim 9, wherein the composition of the elastomeric material of the annular inserts comprises at least one rubber-metal bonding system.

16. The process as claimed in claim 15, wherein said bonding system comprises sulfur, resorcin and cobalt salt.

17. The process as claimed in claim 9, wherein said sidewall portions extend against said at least one carcass ply, starting from respective beads integrating said annular anchoring structures.

18. The process as claimed in claim 9, further comprising manufacturing a cap structure by forming said tread band at a radially external position to said belt structure, and positioning said cap structure at a centered position around the carcass structure before said shaping step.

19. The process of claim 9, wherein, during circumferentially applying annular inserts, the auxiliary drum is set to a minimum diameter.

20. The process of claim 19, further comprising, after circumferentially applying annular inserts, expanding the auxiliary drum from the minimum diameter to a first work diameter for applying strip-like elements.

21. A process for building a tyre comprising:
   forming a carcass structure comprising at least one carcass ply having end flaps in engagement with respective annular anchoring structures;
   forming a belt structure comprising at least one first belt layer; and
   after forming the carcass structure and forming the belt structure, associating said belt structure with said carcass structure,
   wherein forming said carcass structure comprises at least:
      forming at least one carcass ply around a building drum;
      associating a pair of annular anchoring structures with said at least one carcass ply; and
      applying sidewall portions on said at least one carcass ply;
   wherein forming said belt structure comprises at least:
      providing an auxiliary drum having a central axis and a radially external laying surface of substantially cylindrical conformation around the central axis;
      circumferentially applying a pair of annular inserts of raw elastomeric material, axially spaced apart from each other, onto said laying surface, wherein said annular inserts each have an axially external end edge and an axially internal end edge lying against said laying surface, wherein during circumferentially applying annular inserts, the auxiliary drum is set to a minimum diameter;
      after circumferentially applying annular inserts, expanding the auxiliary drum from the minimum diameter to a first work diameter for applying strip-like elements; and
      applying a plurality of strip-like elements onto said laying surface of the auxiliary drum, which strip like elements are disposed in parallel side-by-side relationship with each other in the circumferential extension of said laying surface, so as to form said at least one first belt layer,
   wherein during applying of strip-like elements, the external surfaces of said pair of annular inserts radially exceed the laying surface of the auxiliary drum between the pair of annular inserts, and respectively opposite end portions of each strip-like element are radially superposed, each against one of the annular inserts, in such a manner that each strip-like element has respective axially external end edges at an axially internal position relative to axially external ends of said annular inserts applied on said laying surface; and
   wherein said step of associating said belt structure with said carcass structure is carried out by shaping the carcass structure from a cylindrical shape into a toroidal conformation in such a manner that radially external ends of said sidewall portions become joined to the axially external ends of said annular inserts.

22. The process as claimed in claim 21, further comprising forming a tread band at a radially external position to said belt structure, by winding at least one continuous elongated element of elastomeric material into a plurality of coils disposed close to each other around the belt structure, around the pair of annular inserts, and/or on the auxiliary drum, wherein axially external end portions of the tread band are made of an elastomeric material having a different composition from the composition of the elastomeric material of the axially internal portion of the tread band and being the same as the composition of the elastomeric material of the sidewall portions applied against said at least one carcass ply.

23. The process as claimed in claim 22, wherein forming the tread band at a radially external position to said belt structure comprises:
   winding the at least one continuous elongated element of elastomeric material having the different composition from the elastomeric material of the sidewall portions into a plurality of coils disposed close to each other around the belt structure, around the pair of annular inserts, and the auxiliary drum at a position to form an axially internal portion of the tread band, and
   applying the elastomeric material having the same composition as the elastomeric material of the sidewall portions on the auxiliary drum lateral to the respective pair of annular inserts to form axially external end portions of the tread band.

24. The process as claimed in claim 21, wherein the joining causes the radially external ends of said sidewall portions to be axially internal to and spliced to said axially external end portions of the tread band.

25. The process as claimed in claim 21, wherein said circumferentially applying a pair of annular inserts comprises extruding at least one continuous elongated element of raw, sticky elastomeric material around and onto the laying surface of the auxiliary drum, and wherein said applying of strip-like elements comprises sticking the opposite end portions of each strip-like element to one of the annular inserts, such that each strip-like element is fixed in place relative to said laying surface due to the stickiness of the raw elastomeric material of the extruded annular inserts.

26. The process as claimed in claim 21, wherein the annular inserts are made of an elastomeric material having a composition different from the composition of the elastomeric material of the sidewall portions applied against said at least one carcass ply.

27. The process as claimed in claim 21, wherein the composition of the elastomeric material of the annular inserts comprises at least one rubber-metal bonding system.

28. The process as claimed in claim 27, wherein said bonding system comprises sulfur, resorcin and cobalt salt.

29. The process as claimed in claim 21, wherein said sidewall portions extend against said at least one carcass ply, starting from respective beads integrating said annular anchoring structures.

30. The process as claimed in claim 21, further comprising manufacturing a cap structure by forming said tread band at a radially external position to said belt structure, and positioning said cap structure at a centered position around the carcass structure before said shaping step.

* * * * *